United States Patent
Uhlenbrock et al.

(10) Patent No.: US 10,540,813 B1
(45) Date of Patent: Jan. 21, 2020

(54) THREE-DIMENSIONAL POINT DATA ALIGNMENT

(71) Applicant: THE BOEING COMPANY, Chicago, IL (US)

(72) Inventors: Ryan M. Uhlenbrock, Camarillo, CA (US); Deepak Khosla, Camarillo, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/108,357

(22) Filed: Aug. 22, 2018

(51) Int. Cl.
*G06T 17/00* (2006.01)
*G06K 9/62* (2006.01)
*B25J 9/16* (2006.01)
*G06F 17/16* (2006.01)
*G06F 16/901* (2019.01)

(52) U.S. Cl.
CPC ............ *G06T 17/005* (2013.01); *B25J 9/163* (2013.01); *G06F 16/9027* (2019.01); *G06F 17/16* (2013.01); *G06K 9/6276* (2013.01)

(58) Field of Classification Search
None
See application file for complete search history.

(56) References Cited

PUBLICATIONS

Chaudhury, Kunal N., Yuehaw Khoo, and Amit Singer. "Global registration of multiple point clouds using semidefinite programming." SIAM Journal on Optimization 25.1 (2015): 468-501. (Year: 2015).*
Chaudhury, Kunal N. et al., "Global Registration of Multiple Point Clouds Using Semidefinite Programming," Cornell University Library, Dec. 23, 2014 <https://arxiv.org/abs/1306.5226>, pp. 1-36.
Ho, Ngoc-Diep et al., "On the pseudo-inverse of the Laplacian of a bipartite graph," Applied Mathematics Letters vol. 18, 2005, pp. 917-922.

* cited by examiner

*Primary Examiner* — Vu Nguyen
(74) *Attorney, Agent, or Firm* — Moore IP Law

(57) ABSTRACT

An apparatus includes a nearest neighbor search engine configured to receive multiple sets of surface data. Each of the multiple sets includes three-dimensional point positions of a corresponding portion of a surface of an object. The nearest neighbor search engine is configured to perform a nearest neighbor search based on adjacency data indicating pairs of overlapping sets of the multiple sets to identify, in each pair of overlapping sets, pairs of closest corresponding points that are within a threshold distance of each other. The apparatus includes a transformation matrix generator configured to determine one or more transformation matrices to reduce a global distance metric that corresponds to distances between the points of each identified pair of closest corresponding points. The apparatus also includes a data set aligner configured to generate updated 3D point positions by applying the one or more transformation matrices to one or more of the multiple sets.

20 Claims, 5 Drawing Sheets

THREE-DIMENSIONAL POINT DATA ALIGNMENT

FIELD OF THE DISCLOSURE

The present disclosure is generally related to aligning three-dimensional (3D) point data representing portions of a surface of a scanned object.

BACKGROUND

Manufacturing of components, such as aircraft components, often involves performing a three-dimensional (3D) scan of a manufactured part and generating a 3D model of the part from the scan data. When an object to be scanned is larger than a field of capture of a 3D sensor, a scan of the object is performed by combining multiple scans of overlapping portions of the object. To generate a 3D model, the scan data from the multiple scans may be combined into a 3D model. However, scan data for one or more portions of the object may misaligned with scan data for other portions, preventing accurate combining the scan data. Manual alignment of scan data causes an increased time and cost of the manufacturing process, while automatic alignment of a large number of overlapping scans is computationally prohibitive.

SUMMARY

In a particular implementation, an apparatus includes a nearest neighbor search engine configured to receive multiple sets of surface data. Each of the multiple sets corresponds to a respective portion of a surface of an object and includes three-dimensional (3D) point positions of that portion of the surface of the object. The nearest neighbor search engine is also configured to perform a nearest neighbor search based on adjacency data that indicates pairs of overlapping sets of the multiple sets to identify, in each pair of overlapping sets, pairs of closest corresponding points that are within a threshold distance of each other. The apparatus includes a transformation matrix generator configured to determine one or more transformation matrices to reduce a global distance metric that corresponds to distances between the points of each identified pair of closest corresponding points. The apparatus includes a data set aligner configured to generate updated 3D point positions by applying the one or more transformation matrices to one or more of the multiple sets.

In another particular implementation, a method includes receiving multiple sets of surface data. Each of the multiple sets corresponds to a respective portion of a surface of an object and includes three-dimensional (3D) point positions of that portion of the surface of the object. The method includes performing a nearest neighbor search, based on adjacency data that indicates pairs of overlapping sets of the multiple sets, to identify, in each pair of overlapping sets, pairs of closest corresponding points that are within a threshold distance of each other. The method includes determining one or more transformation matrices to reduce a global distance metric that corresponds to distances between the points of each identified pair of closest corresponding points. The method also includes performing an alignment with respect to the multiple sets. Performing the alignment includes generating updated 3D point positions by applying the one or more transformation matrices to one or more of the multiple sets.

In another particular implementation, a non-transitory, computer readable medium is disclosed that stores instructions that, when executed by a processor, cause the processor to initiate, perform, or control operations. The operations include receiving multiple sets of surface data. Each of the multiple sets corresponds to a respective portion of a surface of an object and includes three-dimensional (3D) point positions of that portion of the surface of the object. The operations include performing a nearest neighbor search, based on adjacency data that indicates pairs of overlapping sets of the multiple sets, to identify, in each pair of overlapping sets, pairs of closest corresponding points that are within a threshold distance of each other. The operations include determining one or more transformation matrices to reduce a global distance metric that corresponds to distances between the points of each identified pair of closest corresponding points. The operations include performing an alignment with respect to the multiple sets. Performing the alignment includes generating updated 3D point positions by applying the one or more transformation matrices to one or more of the multiple sets.

The features, functions, and advantages described herein can be achieved independently in various implementations or may be combined in yet other implementations, further details of which can be found with reference to the following description and drawings.

DETAILED DESCRIPTION

Embodiments disclosed herein perform automatic alignment with respect to sets of 3D point data, such as from three-dimensional (3D) scans of an object. In an implementation, a nearest neighbor search is performed on multiple sets of 3D point data to locate pairs of closest corresponding points in the overlapping regions of the multiple sets. Adjacency data indicates which sets of 3D point data overlap each other, and the nearest neighbor search is constrained to the overlapping sets. The located pairs of closest corresponding points are used to generate transformation matrices for some or all of the multiple sets to reduce a global distance metric associated with the pairs of closest corresponding points. An alignment process includes rotating, translating, or both, 3D point positions in the sets of 3D point data to generate updated 3D point data. The process may be iteratively performed to generate more accurate alignment between the multiple sets of 3D point data. One or more techniques, such as constraining the nearest neighbor search based on the adjacency data, are used to reduce the complexity of multi-set 3D point alignment as compared to conventional techniques. As a result, automated global alignment of the multiple sets is enabled, and an accuracy of the global alignment can be enhanced by using the aligned 3D point data output from one iteration as input 3D point data for a next iteration.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1:
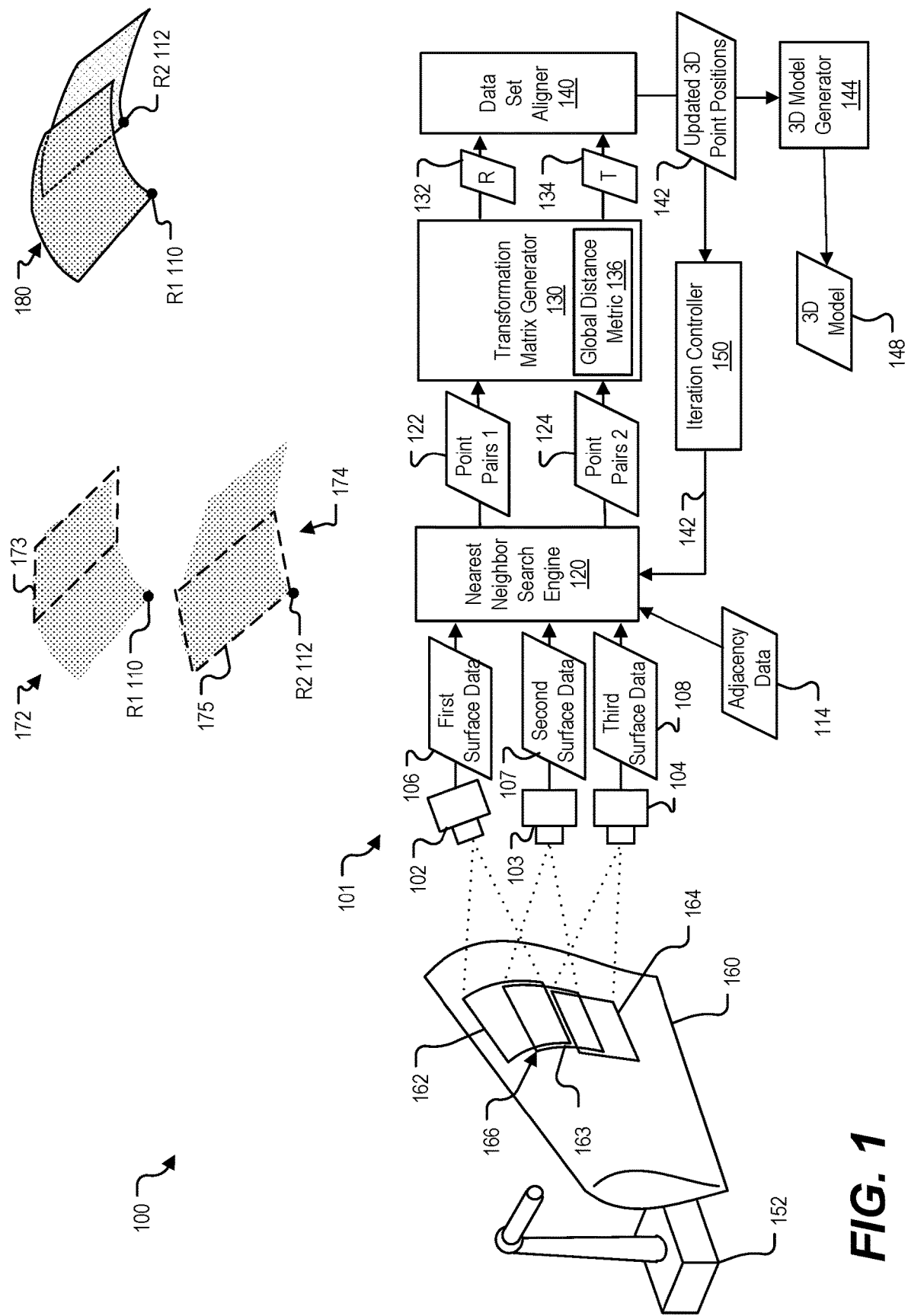
FIG. 1 is a diagram that illustrates a system configured to perform data alignment of 3D surface data of a scanned object.

Referring to FIG. 1, a system 100 is depicted that includes a 3D scanning apparatus 101, an object 160 and a robotic device 152. For clarity of explanation, a first point cloud 172, a second point cloud 174, and a combined point cloud 180 depict illustrative examples of stages of an alignment process at the 3D scanning apparatus 101. The 3D scanning apparatus 101 is configured to capture information regarding the surface of the object 160 as a series of "patches" (also referred to as "tiles") and to piece together the patches to generate a 3D model 148. Because accuracy of the 3D model 148 is impacted if one or more of the patches is misaligned relative to other patches, alignment or "registration" of the patches is performed. The 3D scanning apparatus 101 is configured to automatically align the patches and generate of the 3D model 148. Thus, an accurate 3D depiction of the surface of the object 160 can be obtained, even with scans in which a large number 3D points represented in a large number of patches would be computationally intractable using conventional techniques.

The 3D scanning apparatus 101 includes one or more 3D sensors, illustrated as a first 3D sensor 102, a second 3D sensor 103, and a third 3D sensor 104, configured to perform a 3D scan of the object 160 to generate a first set of surface data ("first surface data") 106, a second set of surface data ("second surface data") 107, and a third set of surface data ("third surface data") 108. The 3D scanning apparatus 101 also includes a nearest neighbor search engine 120, a transformation matrix generator 130, a data set aligner 140, a 3D model generator 144, and an iteration controller 150. The first 3D sensor 102 is configured to generate the first surface data 106 representing a first portion 162 of the surface of the object 160. The second 3D sensor 103 is configured to generate the second surface data 107 representing a second portion 163 of the surface of the object 160. The third 3D sensor 104 is configured to generate the third surface data 108 representing a third portion 164 of the surface of the object 160.

The nearest neighbor search engine 120 is configured to process sets of surface data to generate sets of closest corresponding point pairs. For example, the nearest neighbor search engine 120 is configured to process the first surface data 106 and the second surface data 107 to generate a first set of closest corresponding point pairs ("first point pairs") 122. The nearest neighbor search engine 120 is configured to process the second surface data 107 and the third surface data 108 to generate a second set of closest corresponding point pairs ("second point pairs") 124, such as described in further detail below and with reference to FIG. 3. The transformation matrix generator 130 is configured to perform a global alignment (e.g., registration) with respect to of the first point pairs 122 and the second point pairs 124 to determine transformation matrices, such as a rotation matrix 132 and a translation matrix 134, to be applied to the multiple sets of surface data 106-107 to generate aligned data, such as described in further detail below and with reference to FIG. 4. The data set aligner 140 is configured to process one or more of the first surface data 106, the second surface data 107, and the third surface data 108 based on the transformation matrices to generate updated 3D point positions 142. The iteration controller 150 is configured to determine whether sufficient alignment has been achieved or whether to initiate another iteration by feeding the updated 3D point positions 142 as input to the nearest neighbor search engine 120. The 3D model generator 144 is configured to generate the 3D model 148 based on the final updated 3D point positions 142.

In a particular implementation, the first 3D sensor 102 corresponds to a stereo camera, a time-of-flight camera, a laser scanner, a light detection and ranging (LIDAR) sensor, a structured light camera, one or more other 3D sensors, or combination thereof. The second 3D sensor 103 and the third 3D sensor 104 also correspond to a stereo camera, a time-of-flight camera, a laser scanner, a LIDAR sensor, a structured light camera, one or more other 3D sensors, or combination thereof. In some implementations the first 3D sensor 102, second 3D sensor 103, and the third 3D sensor 104 include the same type of sensor (e.g., laser scanners), and in other implementations the first 3D sensor 102, second 3D sensor 103, and the third 3D sensor 104 include different types of sensors (e.g., the first 3D sensor 102 and the second 3D sensor 103 include laser scanners and the third 3D sensor 104 includes a structured light camera).

The first 3D sensor 102 is aligned such that it captures the first surface data 106 corresponding to the first portion 162. The first surface data 106 includes 3D points (e.g., a list of points with three coordinates, such as (x, y, z)) that are graphically represented as the first point cloud 172, with each point in the first point cloud 172 having a position relative to a first reference (R1) 110. The second 3D sensor 102 is configured to capture the second surface data 107. For example, the second surface data 107 includes 3D surface data corresponding to the second portion 163, such as a collection of 3D points that are graphically represented as the second point cloud 174, with each point in the second point cloud 174 having a position relative to a second reference (R2) 112. The first surface data 106 and second surface data 107 each include a portion that corresponds to an overlap portion 166 of the first portion 162 and the second portion 163. The overlap portion 166 includes multiple 3D points that are used to perform an alignment with reference to the first surface data 106 and the second surface data 107, illustrated as an overlap portion 173 of the first point cloud 172 and an overlap portion 175 of the second point cloud 174.

The nearest neighbor search engine 120 is configured to receive multiple sets of data corresponding to respective portions of the surface of the object 160 and to perform a nearest neighbor search based on adjacency data 114 that indicates pairs of overlapping sets of the multiple sets to identify, in each pair of overlapping sets, pairs of closest corresponding points that are within a threshold distance of each another. To illustrate, the nearest neighbor search engine 120 receives the first surface data 106 of surface data, the second surface data 107 of surface data, and the third surface data 108 of surface data. The adjacency data 114 indicates that the first surface data 106 overlaps the second surface data 107, that the second surface data 107 overlaps the third surface data 108, but that the first surface data 106 does not overlap the third surface data 108. The adjacency data 114 may be received from an external source, retrieved from storage at the 3D scanning apparatus 101, or generated based on the multiple sets of surface data 106-108, as described in further detail with reference to FIG. 3.

The nearest neighbor search engine 120 is configured to identify, for each 3D point in the first surface data 106, a corresponding 3D point in the second surface data 107 that is closest to (and within the threshold distance of) the 3D point in the first surface data 106. Each pair of closest corresponding 3D points in the first surface data 106 and the second surface data 107 may be detected and provided as the first point pairs 122. The nearest neighbor search engine 120 is also configured to determine, for each 3D point in the second surface data 107, a 3D point in the third surface data 108 that is closest to (and within the threshold distance of) the 3D point in the second surface data 107. Each such identified pair of points may be provided as the second point pairs 124. Because the adjacency data 114 indicates that the first surface data 106 does not overlap (or does not overlap enough for alignment purposes) the third surface data 108, no nearest neighbor search is performed with respect to the first surface data 106 to find corresponding points in the third surface data 108. An example of a nearest neighbor search that may be performed by the nearest neighbor search engine is described in further detail with reference to FIG. 3.

The transformation matrix generator 130 is configured to determine one or more transformation matrices to reduce a global distance metric 136 that corresponds to distances between the points of each identified pair of closest corresponding points. To illustrate, the transformation matrix generator 130 may be configured to process the sets of point pairs 122, 124 to generate a data structure that indicates which pair of corresponding points is associated with which two sets of surface data. The transformation matrix generator 130 may be configured to process the generated data structure by performing one or more techniques, such as determining a pseudo-inverse of a Laplacian matrix, to reduce a value of the global distance metric 136. For example, the global distance metric 136 may correspond to a sum of distances or a sum of squares of distances between the points of each pair of closest corresponding points in the received sets of point pairs 122, 124, which may be indicative of a global error amount due to misalignment between surface data sets. The transformation matrix generator 130 is configured to determine one or more transformation matrices, such as the representative rotation matrix 132 and the representative translation matrix 134, to be applied to the sets of surface data to reduce the global distance metric 136. The resulting transformation matrices are provided to the data set aligner 140.

The data set aligner 140 is configured to perform an alignment with respect to the first surface data 106, the second surface data 107, and the third surface data 108 based on the at least one of the translation matrix 134 or the rotation matrix 132 to generate updated 3D point positions 142. In an illustrative example, after the rotation matrix 132 and translation matrix 134 have been determined, the data set aligner 140 applies the rotation matrix 132 and the translation matrix 134 to the second surface data 107 (e.g., to adjust a position and orientation of the second reference 112) to register the second surface data 107 with the first surface data 106 to generate the combined point cloud 180.

Although operation of the data set aligner 140 is described with reference to applying the rotation matrix 132 and the translation matrix 134 to the second surface data 107 to align the second surface data 107 with respect to the first surface data 106, it should be understood that the data set aligner 140 is configured to apply a rotation matrix and a transformation matrix to each of the sets of surface data to perform a global alignment of all of the sets of surface data with respect to each other. Thus, for each portion of the object 160 that is captured separately as a tile of surface data, a pair of transformation matrices may be generated by the transformation matrix generator 130 and applied to the set of surface data by the data set aligner 140. Applying the transformation matrices to the sets of surface data adjusts the global positions of the 3D points in each of the sets of surface data, resulting in the updated 3D point positions 142.

The iteration controller 150 is configured to route the updated 3D point positions 142 to an input of the nearest neighbor search engine 120 to initiate a next iteration of an iterative point correspondence and registration process. The iteration controller 150 is configured to determine whether a termination condition has been satisfied. For example, the termination condition may correspond to a value of the global distance metric 136 being lower than a threshold amount, transformation metric indicating an amount of transformation performed by the data set aligner 140 being less than a global transformation metric, or another condition. The iteration controller 150 may continue receiving updated 3D point positions 142 resulting from each iteration of the iterative point correspondence and registration process and routing the updated 3D point positions 142 to the nearest neighbor search engine 120 to initiate a next iteration of the iterative point correspondence and registration process until either the termination condition is met or a threshold number of iterations have been performed. A particular implementation of the iterative point correspondence and registration process is described in further detail with reference to FIG. 2.

The 3D model generator 144 is configured to receive the multiple sets of surface data after generation of the updated 3D point positions 142 and to combine the multiple sets to generate the 3D model 148 of the object 160. In some implementations, the 3D model 148 is used in one or more fabrication processes or design processes, such as for quality control (e.g., comparing the 3D model 148 to a reference model to locate defects), visualization, robotic control, or simulation, as illustrative, non-limiting examples. In a particular example, the 3D model 148 is provided to the robotic device 152 for use in an operation on the object 160, and the robotic device 152 is controlled to interact with the object 160 based on the 3D model 148. For example, the 3D model 148 could be input to a robot path planning algorithm that creates instructions to guide the robotic device 152 on a path along the surface while maintaining a given distance from the surface at all times. As another example, the robotic device 152 could be instructed to go to particular positions on the surface and perform some task, e.g. insert a rivet. As illustrated, the object 160 is a component of an aircraft and the robotic device 152 includes a robotic spray painter. The robotic device 152 is operative to perform precise application of paint to the surface of the object 160 in accordance with the modeled surface of the object 160 provided by the 3D model 148.

The 3D scanning apparatus 101 enables relatively high-precision capture of data describing the surface of the object 160 as a series of patches or tiles, and automatic registration by reducing distances between corresponding points in overlapping tiles based on the adjacency data 114, in an iterative process, to generate the 3D model 148. By using the adjacency data 114 to constrain the number of sets of surface data that are to be processed via the nearest neighbor search so that only sets with sufficient overlap are processed, global alignment of the multiple sets of surface data can be automatically performed without prohibitive cost. As a result, alignment of the multiple sets of surface data to generate the 3D model 148 can be performed at higher speed and reduced cost, and with enhanced accuracy, as compared to conventional techniques. By performing data alignment iteratively, the 3D scanning apparatus 101 enables enhanced accuracy, with each iteration performing a closer 3D point alignment as compared to the prior iteration, until an accuracy threshold is met.

Although only three portions of the surface of the object 160, e.g., first portion 162, second portion 163, and third portion 164, are illustrated, it should be understood that in some implementations the system 3D scanning apparatus 101 is configured to scan all (or substantially all) of the surface of the object 160 using multiple overlapping patches to generate a full scan of the surface of the object 160. Although three 3D sensors (the first 3D sensor 102, the second 3D sensor 103, and the third 3D sensor 104) are illustrated, in other implementations the 3D scanning apparatus 101 may include a single 3D sensor, two 3D sensors, or more than three 3D sensors. For example, the 3D scanning apparatus 101 may include a sufficient number of 3D sensors to span an entire height of the object 160. As another example, the 3D scanning apparatus 101 may include a single 3D sensor that is repeatedly moved during the scanning operation to scan the surface of the object 160. In some implementations, the 3D sensors 102-104 are omitted and the nearest neighbor search engine 120 processes surface data that is received via another source, such as surface data received from a remote 3D scanner.

Although the nearest neighbor search engine 120, the transformation matrix generator 130, the data set aligner 140, the 3D model generator 144, and the iteration controller 150 are depicted as separate components, in other implementations the described functionality of two or more of the nearest neighbor search engine 120, the transformation matrix generator 130, the data set aligner 140, the 3D model generator 144, and the iteration controller 150 can be performed by a single component. In some implementations, one or more of the 3D model generator 144 or the iteration controller 150 can be omitted. For example, in some implementations the updated 3D point positions 142 are transmitted to another system to generate a 3D model or to perform other processing on the updated 3D point positions 142, and the 3D model generator 144 is omitted from the 3D scanning apparatus 101. As another example, in some implementations a single iteration of processing at the nearest neighbor search engine 120, the transformation matrix generator 130, and the data set aligner 140 provides sufficient accuracy in aligning the patches, and the iteration controller 150 is omitted from the 3D scanning apparatus 101. In some implementations, each of the nearest neighbor search engine 120, the transformation matrix generator 130, the data set aligner 140, the 3D model generator 144, and the iteration controller 150 can be represented in hardware, such as via an application-specific integrated circuit (ASIC) or a field-programmable gate array (FPGA), or the operations described with reference to the elements may be performed by a processor executing computer-readable instructions.

Figure 2:
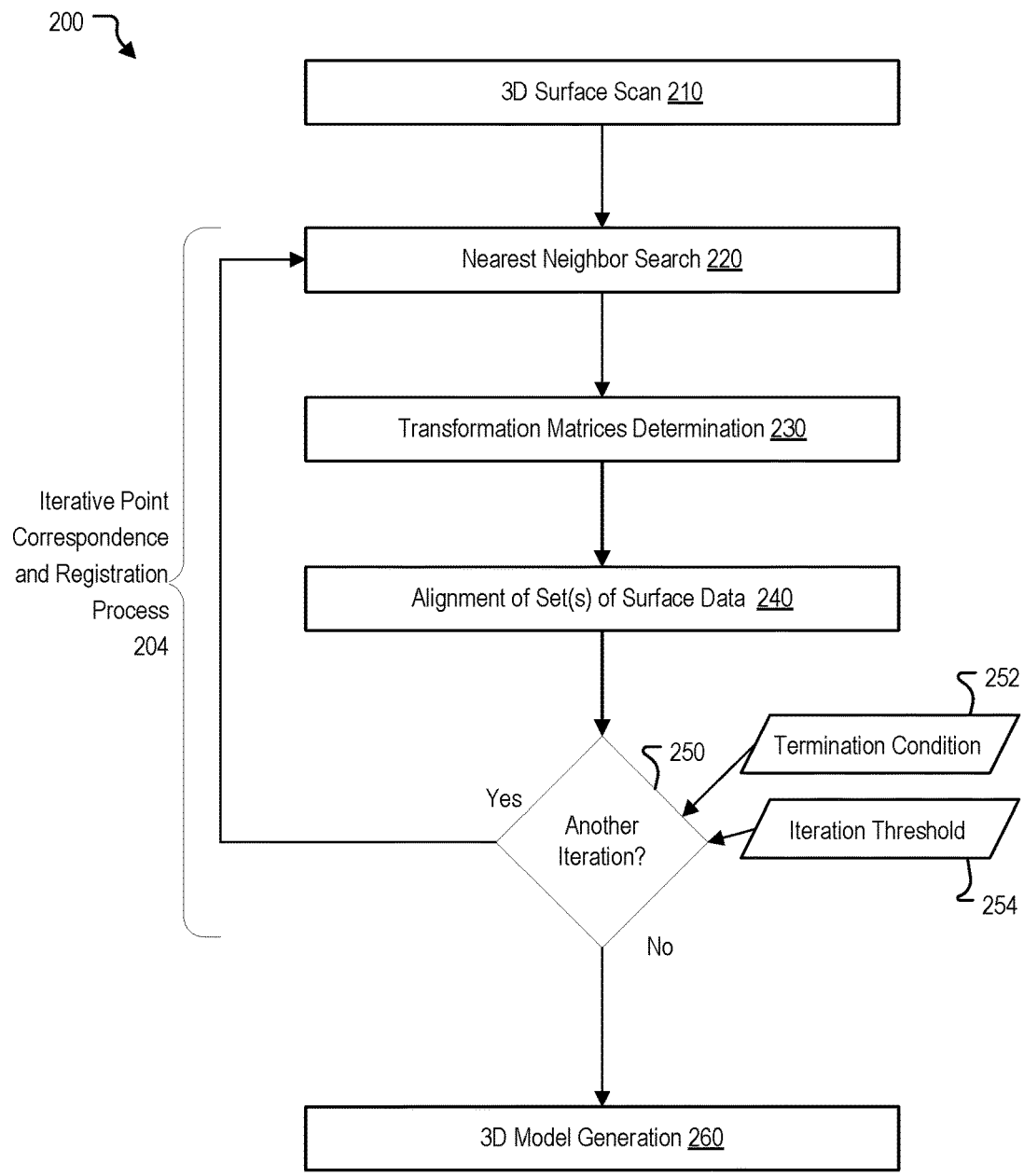
FIG. 2 is a diagram that illustrates a flow chart of an example of a method that may be performed by the system of FIG. 1.

FIG. 2 depicts an example of a method 200 that may be performed by the 3D scanning apparatus 101 of FIG. 1. The method 200 includes performing a 3D surface scan 210. For example, the 3D surface scan 210 can be performed by the 3D sensors 102-104 of FIG. 1 to generate multiple sets of surface data, such as the surface data 106-108.

The method 200 includes performing a nearest neighbor search 220. For example, the nearest neighbor search 220 can be performed by the nearest neighbor search engine 120. The nearest neighbor search 220 includes detecting two sets of surface data that overlap based on the adjacency data 114. For each point in one of the two sets of surface data that overlap, a closest point in the other set of surface data that is less than a threshold distance from that point is identified. Each such identified pair of closest corresponding points is recorded and provided as one or more of the sets of point pairs 122, 124. Additional details of the nearest neighbor search are described further with reference to FIG. 3.

The method 200 includes performing a transformation matrices determination 230. Determining the transformation matrices can be performed by the transformation matrix generator 130 and includes processing the received sets of corresponding point pairs and identifying one or more transformations to apply to each of the sets of surface data to reduce the global distance metric 136. The identified transformations are output as transformation matrices, such as the representative rotation matrix 132 and translation matrix 134 of FIG. 1. A particular implementation of determining the transformation matrices is provided in further detail with reference to FIG. 4.

The method 200 includes performing an alignment 240 of one or more sets of the surface data. For example, aligning the sets of the surface data can be performed by the data set aligner 140. In some implementations, aligning the sets of surface data includes applying the transformation matrices to the respective one or more sets of surface data to at least partially align the one or more sets of surface data with one or more of the other sets of surface data. In some implementations, transformation matrices are generated and applied to each of the sets of surface data. In other implementations, one set of surface data may be held constant as a global reference, and each of the other sets of surface data is transformed to align with the reference set of surface data. For example, one patch from sensor may be selected to be the origin of the global coordinate system and the transforms for the remaining patches may be pre-multiplied by the inverse of the transform of the selected patch.

The method 200 includes performing a determination 250 as to whether another iteration is to be performed. To illustrate, the nearest neighbor search 220, the determination 230 of the transformation matrices, and the alignment 240 of the sets of surface data are included in an iterative point correspondence and registration process 204. The determination 250 may be made based on a termination condition 252, an iteration threshold 254, or combination thereof. For example, one or more additional iterations of the process 204 can be performed until at least one of the termination condition 252 is satisfied or a threshold number of iterations matching the iteration threshold 254 have been performed.

In some implementations, the termination condition 252 is satisfied in response to a transformation distance metric being less than a transformation distance threshold. Additional examples of a transformation distance metric and a transformation threshold are provided with reference to FIG. 4.

After determining that no more iterations of the process 204 are to be performed, the method 200 includes a 3D model generation 260. For example, the 3D model can be generated by the 3D model generator 144 based on the updated point positions 142 and can correspond to generate the 3D model 148.

By performing the 3D surface scan 210 to generate multiple sets of surface data and performing the iterative point correspondence and registration process 204 to align the sets of surface data, the method 200 enables enhanced accuracy as compared to a non-iterative alignment process. For example, each iteration of the iterative point correspondence and registration process 204 may result in a closer 3D point alignment as compared to the prior iteration, and iterations may continue to be performed to achieve a desired accuracy, or until a threshold number of iterations has been met.

Figure 3:
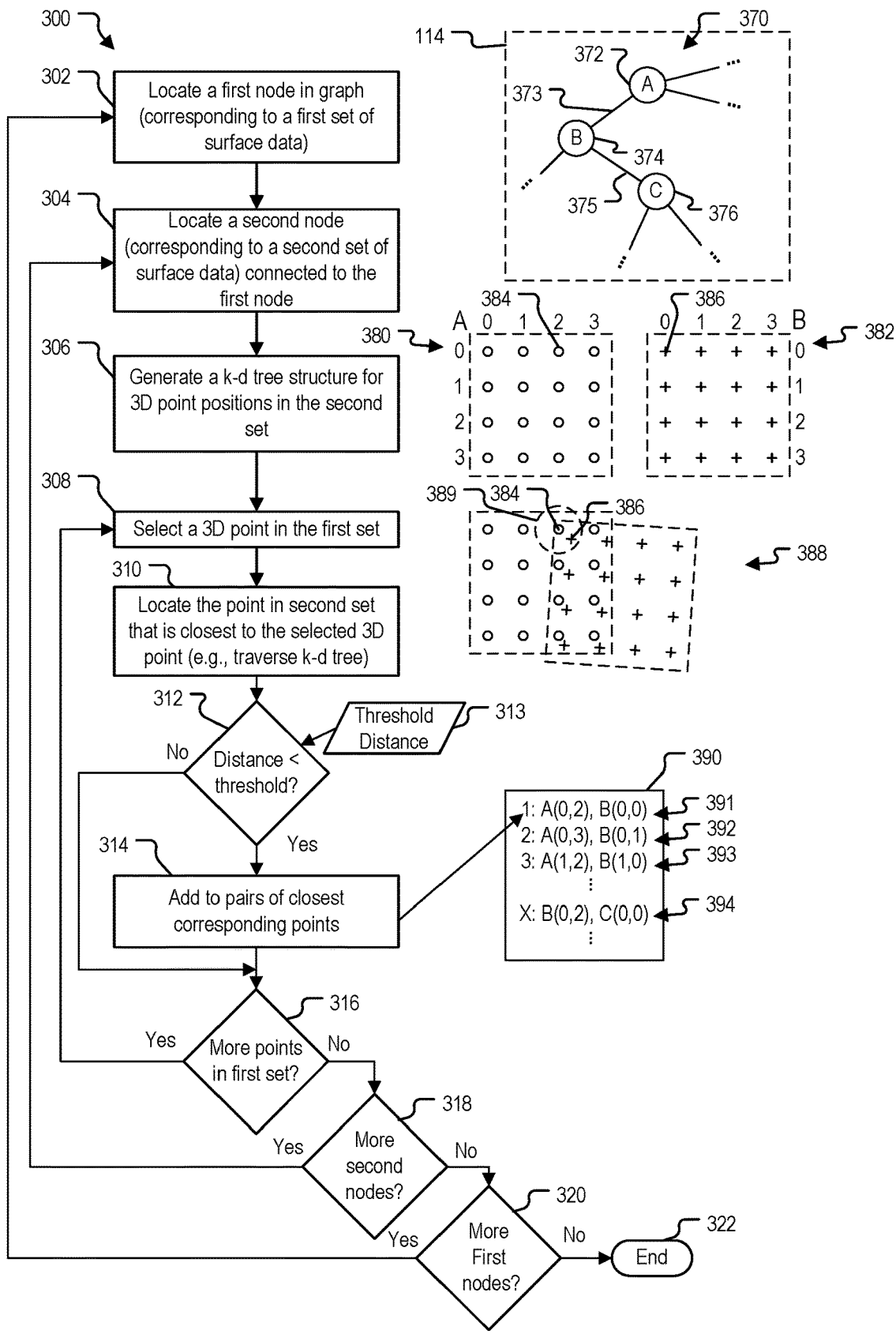
FIG. 3 is a diagram that illustrates a flow chart of an example of a nearest neighbor search that may be performed by the system of FIG. 1.

FIG. 3 depicts a method 300 of performing a nearest neighbor search for adjacent tiles of 3D points. For example, the method 300 can be performed by the nearest neighbor search engine 120 of FIG. 1, can be included in the nearest neighbor search 220 of FIG. 2, or a combination thereof.

The adjacency data 114 is illustrated as a graph 370 that includes multiple nodes, such as node A 372, node B 374, and node C 376. Each node in the graph 370 corresponds to a set of surface data. In an illustrative example, node A 372 corresponds to the first surface data 106, node B 374 corresponds to the second surface data 107, and node C 376 corresponds to the third surface data 108. Nodes are connected by edges, such as a first edge 373 that connects node A 372 to node B 374 and a second edge 375 that connects node B 374 to node C 376. Each edge connecting two nodes in the graph 370 indicates that an amount of overlap between the sets of surface data that correspond to the two nodes is sufficient to use points in the overlap region as part of a global alignment operation (e.g., the amount of overlap exceeds a threshold). For example, the first edge 373 indicates that the first set of surface data corresponding to node A 372 overlaps the second set of surface data corresponding to node B 374. The second edge 375 indicates that the second set of surface data corresponding to node B 374 overlaps the third set of surface data corresponding to node C 376. The lack of an edge between node A 372 and node C 376 indicates that there is insufficient overlap between the first set of surface data and the third set of surface data.

Nodes that have significant overlap could be known a priori from the physical configuration of sensors or from the known sequence of point clouds generated from a moving sensor (e.g., 3D sensor 102). Alternatively, in some implementations the method 300 includes generating the adjacency data 114 based on determining weights associated with the edges between nodes for every pair of nodes in the graph 370. In some implementations, edge weights are generated by calculating the area of expected overlap between sensors' field of view (e.g., the overlap between the first portion 162 captured by the first 3D sensor 102 and the second portion 163 captured by the second 3D sensor 103) given approximate extrinsic calibration and sensor characteristics. In some implementations, each edge weight in the graph 370 is calculated for each pair of nodes in the graph and represents the percentage of expected overlap between the two sensors' data or fields of view that are associated with the two nodes.

In some implementations, the adjacency data 114 is determined using a "point-based" process that includes performing a nearest neighbor search between all the points in one point cloud corresponding to one node and the points of another point cloud corresponding to another node. The weight of an edge between the nodes is set to the percentage of points whose distance to their nearest neighbor is less than a threshold. In some implementations, a "frustum-based" process is used that includes constructing a viewing frustum of each sensor based on the sensors' intrinsic parameters. The intersection of two frusta (corresponding to the sensors associated with the point clouds of the two nodes) is calculated and the edge weight between the two nodes is set to the volume of the intersection divided by the volume of the union. The frustum-based process may provide advantages when all sensors are approximately facing the same direction and the scene is relatively simple, such as a single large planar object. In some implementations, an "occlusion-raycasting"-based process includes constructing a raycasting simulation with each point in a point cloud represented by a sphere with radius equal to the spacing between points. To estimate the edge-weight between two nodes, a ray is cast from each point of the point cloud of one node associated with one sensor to the estimated location of another sensor associated with the point cloud of the other node. The percentage of rays that reach the other sensor without being occluded by another sphere is set as the edge weight. The occlusion-raycasting-based process may provide advantages when the sensors are facing many directions, such as sensors in a circle facing the center point, and the scene is relatively complex, such as multiple objects with occlusions and gaps. After determining edge weights between each pair of nodes, edges having weights less than a threshold can be discarded as representing an insufficient amount of overlap, and edges having weights greater than or equal to the threshold can be used to select node pairs for nearest neighbor searching.

The method 300 includes locating a first node in a graph 370 of the adjacency data 114, at 302. The first node corresponds to a first set of surface data, such as the first surface data 106 of FIG. 1. The method 300 includes locating a second node connected to the first node, at 304. For example, when the first node is node A 372, the second node connected to the first node may be located by traversing the graph 370 and determining that node B 374 is connected to node A 372 via the first edge 373.

The method 300 includes generating a k-dimensional (k-d) tree structure for 3D point positions in the second set of surface data corresponding to the second node, at 306. For example, the k-d tree structure may be generated to reduce computational complexity associated with locating points of second set of surface data corresponding to the second node that are within a threshold distance from a particular point in the first set of surface data corresponding to the first node.

The method 300 includes selecting a 3D point in the first set, at 308. For illustration, a simplified first point cloud 380 graphically depicts 3D points in the first set of surface data corresponding to node A 372, and a simplified second point cloud 382 graphically depicts 3D points in the second set of surface data corresponding to node B 374. The first point cloud 380 illustrates points arranged in an array having four rows labeled 0-3 and four columns labeled 0-3. A representative first point 384 may correspond to the selected point in the first set. The points in the second point cloud 382 are also arranged in an array having four rows labeled 0-3 and four columns labeled 0-3.

The first point cloud 380 and the second point cloud 382 overlap such that, when properly aligned, the first point 384 and the second point 386 are in the same position. That is, the first point 384 and the second point 386 are a pair of closest corresponding points. However, the second point cloud 382 is misaligned with respect to the first point cloud 380, as illustrated in an overlapping point cloud 388. As depicted in the overlapping point cloud 388, the second point cloud 382 is shifted down relative to the first point cloud 380 and is rotated relative to the first point cloud 380. As result, corresponding points in the overlapping portion between the first point cloud 380 and the second point cloud 382 are not aligned with each other.

After selecting the first 3D point in the first set, at 308, the method 300 includes locating the point in the second set that is closest (e.g., by Euclidean distance) to the selected 3D point, at 310. For example, when the selected 3D point is the first point 384, the closest point in the second set of surface data is the second point 386. Locating the point in the second set that is closest to the selected 3D point in the first set may be performed by traversing the k-d tree structure.

The method 300 includes determining whether the distance between the first point and the located point in the second set is less than a threshold distance 313, at 312. For example, the second point 386 is determined to be within the threshold distance 313 of the first point 384. The threshold distance 313 is graphically illustrated as a circle 389 centered at the first point 384. Any point in the first set that is determined to not have any points of the second set within the threshold distance 313 may be determined to be outside of an overlap region between the first set and the second set.

In response to determining that the distance is not less than the threshold distance 313, at 312, the method 300 proceeds to a determination of whether there exist more points in the first set that have not yet been processed, at 316. In response to determining that at least one more point in the first set has not been processed, the method 300 returns to select the next 3D point in the first set, at 308.

When the distance is determined to be less than the threshold distance 313, at 312, information regarding the selected point in the first set and the located point in the second set is added to the pairs of closest corresponding points, at 314. For example, a data structure 390 is illustrated that includes a list of identified pairs of closest corresponding points. A first point includes a point at row 0 and column 2 of the first set (e.g., the first point 384 of the first set corresponding to node A 372) and a point at row 0, column 0 of the second set (e.g., the second point 386 of the second set corresponding to node B 374), as a first pair 391. The data structure 390 includes information regarding other pairs such as a second pair 392, a third pair 393, and one or more other pairs including an Xth pair 394 (X is a positive integer greater than three).

After adding the located pair to the data structure 390, the method 300 determines whether more points in the first set remain unprocessed, at 316. In response to determining that no more points in the first set remain unprocessed, the method 300 includes determining whether one or more second nodes that are connected to the first node via an edge remain unprocessed, at 318. In response to determining that one or more second nodes connected to the first node remain unprocessed, the method 300 locates another second node connected to the first node, at 304, to perform closest point matching with the points of the first node.

When all nodes connected to the first node have been processed, the method 300 proceeds to determining whether one or more additional nodes have not been processed as the first node, at 320. For example, after processing node A 372 as the first node, and processing all nodes connected to node A 372 as second nodes, node B 374 may be selected as the next first node, and node C 376 may be located as a second node that is connected to node B 374 (note that because closest corresponding points between node A 372 and node B have already been identified, node A is not chosen as a second node).

Thus, the graph 370 of the adjacency data 114 may be traversed and each pair of connected nodes may be processed. When all nodes connected to two or more other nodes have been processed as a first node, a determination may be made that no more first nodes remain unprocessed, at 320, and the method 300 ends, at 322.

Upon completion of the method 300, the data structure 390 includes all pairs of closest corresponding points between each of the overlapping sets of data of the multiple sets of surface data. To illustrate, the pairs of closest corresponding points corresponding to the overlap between node A 372 and node B 374 may correspond to the first pairs of closest corresponding points 122 of FIG. 1, and the pairs of closest corresponding points corresponding to the overlap between node B 374 and node C 376 may correspond to the second pairs of closest corresponding points 124.

Although the method 300 depicts an illustrative example of a nearest neighbor search, other implementations of a nearest neighbor search may deviate from the method 300. For example, when parallel processing units are available, multiple first nodes may be selected and processed in parallel, multiple second modes may be located and processed in parallel for a selected first node, multiple points of the first node may be processed to find a closest corresponding point in a second node in parallel, or any combination thereof. As another example, the k-d tree may be omitted or another search enhancement technique may be used instead. As another example, points that are within the threshold distance 313 to a first point may be identified before, or concurrently with, identifying which of the points is closest to the first point (e.g., operations 310 and 312 may be exchanged).

Figure 4:
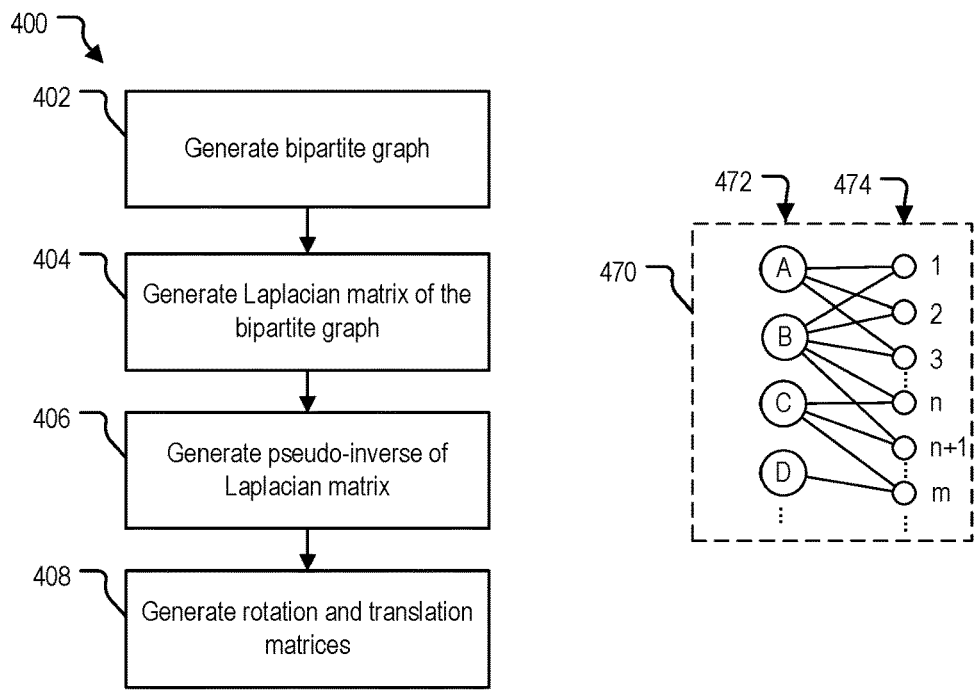
FIG. 4 is a diagram that illustrates a flow chart of an example of a method of reducing a global distance metric that may be performed by the system of FIG. 1.

FIG. 4 depicts a method 400 of performing a global alignment operation using pairs of closest corresponding points, such as the point pairs 122, 124 of FIG. 1 or the point pairs in the data structure 390 of FIG. 3. In a particular example, the method 400 can be performed by the transformation matrix generator 130 of FIG. 1, can be included in the alignment 240 of sets of surface data of FIG. 2, or both.

The method 400 includes generating a bipartite graph, at 402. A simplified bipartite graph 470 is illustrated that includes a first set of nodes 472 and a second set of nodes 474. Each node in the first set of nodes 472 corresponds to a patch of surface data, such as the first surface data 106, the second surface data 107, and the third surface data 108. Each node in the second set of nodes 474 corresponds a pair of closest corresponding points, such as the first pair 391, the second pair 392, the third pair 393, and the Xth pair 394 of FIG. 3. Each node in the second set of nodes 474 is connected to two nodes in the first set of nodes 472 via edges. As illustrated, nodes 1, 2, 3, . . . (n−1) (where n is a positive integer) are connected to node A and node B and represent points in the overlap portion between node A and node B. Nodes n, n+1, . . . (m−1) (where m is a positive integer greater than n) are connected to node B and node C and represent points in the overlap portion between node B and node C. Node m is connected to node C and node D and represent a point in the overlap portion between node C and node D.

The method 400 includes generating a Laplacian matrix of the bipartite graph 470, at 404. For example, the Laplacian matrix L of the graph 470 can be generated as:

$$L = \sum_{(k,i) \in E} e_{ki} e_{ki}^T$$

where E represents the set of edges in the graph 470, k represents a point index (e.g., point k), i represents an index of a patch (e.g., patch i), (k, i) ∈ E indicates point k is in patch i, and $e_{ki} = e_k^{M+N} - e_{N+i}^{M+N}$, where M is the number of patches, N is the number of closest corresponding pairs (e.g., the number of nodes in the second set of nodes 474), $e_k^{M+N}$ is an vector of dimension M+N with all zero values except for a one value at element k (corresponding to point k), and $e_{N+i}^{M+N}$ is a vector of dimension M+N with all zero values except for a one value at element N+i (corresponding to patch i).

The method 400 includes generating a pseudo-inverse of the Laplacian matrix, at 406. For example, the pseudo-inverse $L^+$ can be generated as:

$$L^+ = \left(I_t - \frac{1}{t} e_t e_t^T\right) D^{-1/2} \tilde{L}^+ D^{-1/2} \left(I_t - \frac{1}{t} e_t e_t^T\right)$$

where $I_t$ represents the identity matrix with dimension t, t equals the number of patches (i.e., the number of nodes in the first set of nodes 472)+the number of pairs of closest corresponding points (i.e., the number of nodes in the second set of nodes 474), $e_t$ represents an all-ones column vector of size t, D represents a diagonal matrix with diagonal entries $D_{ii} = \sum_{j=1}^t L_{ij}$, and $\tilde{L}^+$ represents the generalized inverse of the normalized Laplacian.

The method 400 includes generating rotation and translation matrices, at 408. Table 1 includes a sequence of operations that represents a particular implementation of the method 400 using spectral relaxation.

TABLE 1

1. Construct L, B, and A using the graph 470, where
   $A = \sum_{(k,i) \in E} (e_i^M \otimes I_d) x_{k,i} x_{k,i}^T (e_i^M \otimes I_d)^T$ and
   $B = \sum_{(k,i) \in E} (e_i^M \otimes I_d) x_{k,i} e_{ki}^T$, where $e_i^M$ is a vector of dimension M that corresponds to the position of the $i^{th}$ patch, ⊗ is a Kronecker product operator, d is the number of spatial dimensions (e.g., 3), and $X_{k,i}$ is a vector corresponding to the position of point i in patch k.
2. Compute $L^+$ and $C = A - BL^+B^T$
3. Compute the bottom d eigenvectors of C, and compute $W^* = \sqrt{M}[r_1 \ldots r_d]^T$, where $r_i$ is the $i^{th}$ eigenvector of C
4. For i = 1 to M do
5. $O_i^* = U_i V_i^T$, where $U \Sigma V^T$ is the singular value decomposition (SVD) of $W^*$
6. End for
7. $O^* = [O^*_1 \ldots O^*_M]$
8. $Z^* = O^*B L^+$
9. Return the first N columns of $Z^*$ In Table 1, line 1 corresponds to generating the Laplacian matrix at 404 of the method 400, line 2 corresponds to generating the pseudo-inverse of the Laplacian matrix at 406 of the method 400, and lines 3-8 correspond to generating the rotation matrices ($O^*$) and the translation matrices (columns N+1 to N+M of $Z^*$) at 408 of the method 400. Line 9 corresponds to generating the updated 3D point positions, such as may be performed by the data set aligner 140 of FIG. 1 or may correspond to the alignment 240 of sets of surface data of FIG. 2.

The method 400 and the pseudocode of Table 1 perform a global alignment by finding rotations and translations of each of the patches to minimize a global distance metric (e.g., the global distance metric 136) corresponding to a least-squares or quadratic loss:

$$\phi = \sum_{k,i \in E} \|x_k - O_i x_{k,i} - t_i\|^2$$

where $x_k$ corresponds to the position of point k, O is a rotation matrix for patch i, $x_{k,i}$ is the position of the point corresponding to point k in patch i, and $t_i$ is a translation matrix for patch i. The above global distance metric is expressed in terms of distance that each point of each patch is offset from the correct position of that point; however, other global distance metrics may be used.

In contrast to multiple-patch registration methods that align two patches with each other to generate an aligned point cloud, then sequentially aligning patches to, and combining the aligned patches with, the aligned point cloud, the method 400 performs a single, global alignment (as opposed to a sequence of 2-patch alignments). As a result, when a large number of patches are used, the method 400 may generate a more accurate alignment in shorter time as compared to sequentially aligning the patches.

Figure 5:
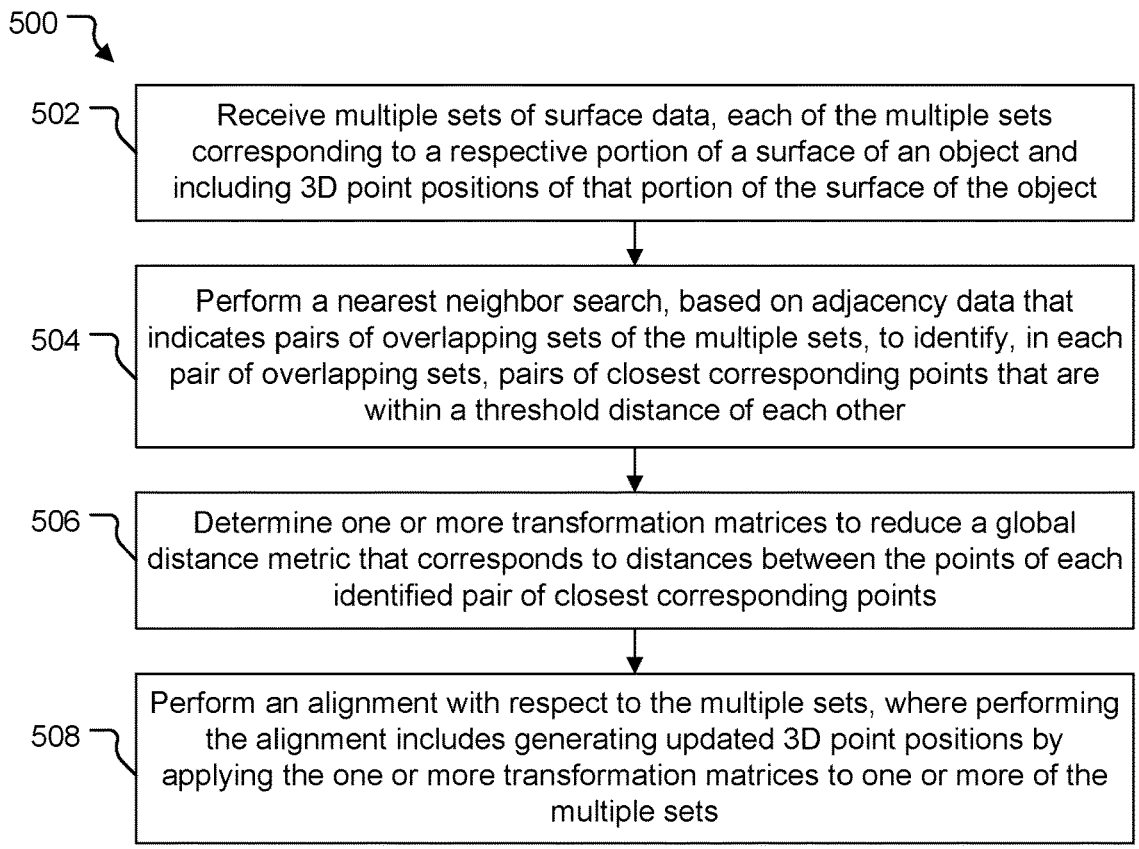
FIG. 5 is a diagram that illustrates a flow chart of an example of a method of performing data alignment that may be performed by the system of FIG. 1.

FIG. 5 depicts a method 500 of surface data alignment. In a particular implementation, the method 500 is performed by the 3D scanning apparatus 101 of FIG. 1. The method 500 includes receiving multiple sets of surface data, at 502. Each of the multiple sets corresponds to a respective portion of a surface of an object and includes three-dimensional (3D) point positions of that portion of the surface of the object. In a particular implementation, the object includes a component of an aircraft. In an example, the multiple sets of surface data correspond to the sets of surface data 106-108 received at the nearest neighbor search engine 120 of FIG. 1. In some implementations, the method 500 also includes performing a 3D scan of the object to generate the multiple sets of surface data, such as a 3D scan of the object 160 performed by the 3D sensors 102-104 of FIG. 1.

The method 500 includes performing a nearest neighbor search, based on adjacency data that indicates pairs of overlapping sets of the multiple sets, to identify, in each pair of overlapping sets, pairs of closest corresponding points that are within a threshold distance of each other, at 504. In an example, the nearest neighbor search corresponds to the method 300 of FIG. 3 and is performed by the nearest neighbor search engine 120 of FIG. 1.

In some implementations, the adjacency data corresponds to a graph, such as depicted with reference to the adjacency data 114 in FIG. 3. Each node in the graph, such as node A 372, node B 374, and node C 376, corresponds to a respective set of surface data. Each edge connecting two nodes in the graph, such as edge 373 and edge 375, indicates overlap between the sets of surface data that correspond to the two nodes. The nearest neighbor search may be selectively performed on pairs of nodes based on the edges. In some implementations, the nearest neighbor search includes locating a first node in the graph, locating a second node connected to the first node via an edge in the graph, and generating a k-d tree structure for the 3D point positions of the set of surface data corresponding to the second node, such a described with reference to FIG. 3. The nearest neighbor search may also include locating, for each point in the set of surface data corresponding to the first node, the closest point that is within the threshold distance in the set of surface data corresponding to the second node based on traversing the k-d tree structure.

The method 500 includes determining one or more transformation matrices to reduce a global distance metric that corresponds to distances between the points of each identified pair of closest corresponding points, at 506. In an example, determining the one or more transformation matrices corresponds to the method 400 of FIG. 4 and is performed by the transformation matrix generator 130 of FIG. 1. In some implementations, the method 500 includes generating a bipartite graph, such as the bipartite graph 470 of FIG. 4, that includes a first set of nodes and a second set of nodes and processing the bipartite graph to determine the one or more transformation matrices. For example, as described with reference to the bipartite graph 470, each node in the first set of nodes 472 corresponds to a respective one of the sets of surface data, each node of the second set of nodes 474 corresponds to a respective pair of points of the identified pairs of closest corresponding points, and each node of the second set of nodes is connected to two nodes of the first set of nodes.

The method 500 includes performing an alignment with respect to the multiple sets, at 508. Performing the alignment includes generating updated 3D point positions by applying the one or more transformation matrices to one or more of the multiple sets. In an example, the alignment is performed by the data set aligner 140 of FIG. 1.

In some implementations, the method 500 includes, after performing the alignment with respect to the multiple sets, combining the multiple sets to generate a 3D model of the object. In an example, combining the multiple sets and generating the 3D model are performed by the 3D model generator 144 of FIG. 1. In an illustrative example, the method 500 also includes controlling a robotic device, such as the robotic device 152 of FIG. 1, to interact with the object based on the 3D model.

In some implementations, the nearest neighbor search, determining the one or more transformation matrices, and generating the updated 3D point positions are performed during a first iteration of an iterative point correspondence and registration process. In an example, the iterative point correspondence and registration process corresponds to the iterative point correspondence and registration process 204 of FIG. 2. The method 500 may also include performing one or more additional iterations of the iterative point correspondence and registration process until at least one of a termination condition is satisfied or a threshold number of iterations have been performed. The termination condition is satisfied in response to a transformation distance metric being less than a transformation distance threshold. In an example, determining whether to perform one or more additional iterations of the iterative point correspondence and registration process is performed by the iteration controller 150 of FIG. 1.

By including techniques such as constraining the nearest neighbor search based on the adjacency data, the method 500 includes reduced complexity of multi-set 3D point alignment as compared to unconstrained multi-set 3D point alignment. The method 500 may be iteratively performed to generate more accurate alignment between the multiple sets of 3D point data. By using the aligned 3D point data output from one iteration as input 3D point data for a next iteration, automated global alignment of the multiple sets can be performed with enhanced accuracy.

Figure 6:
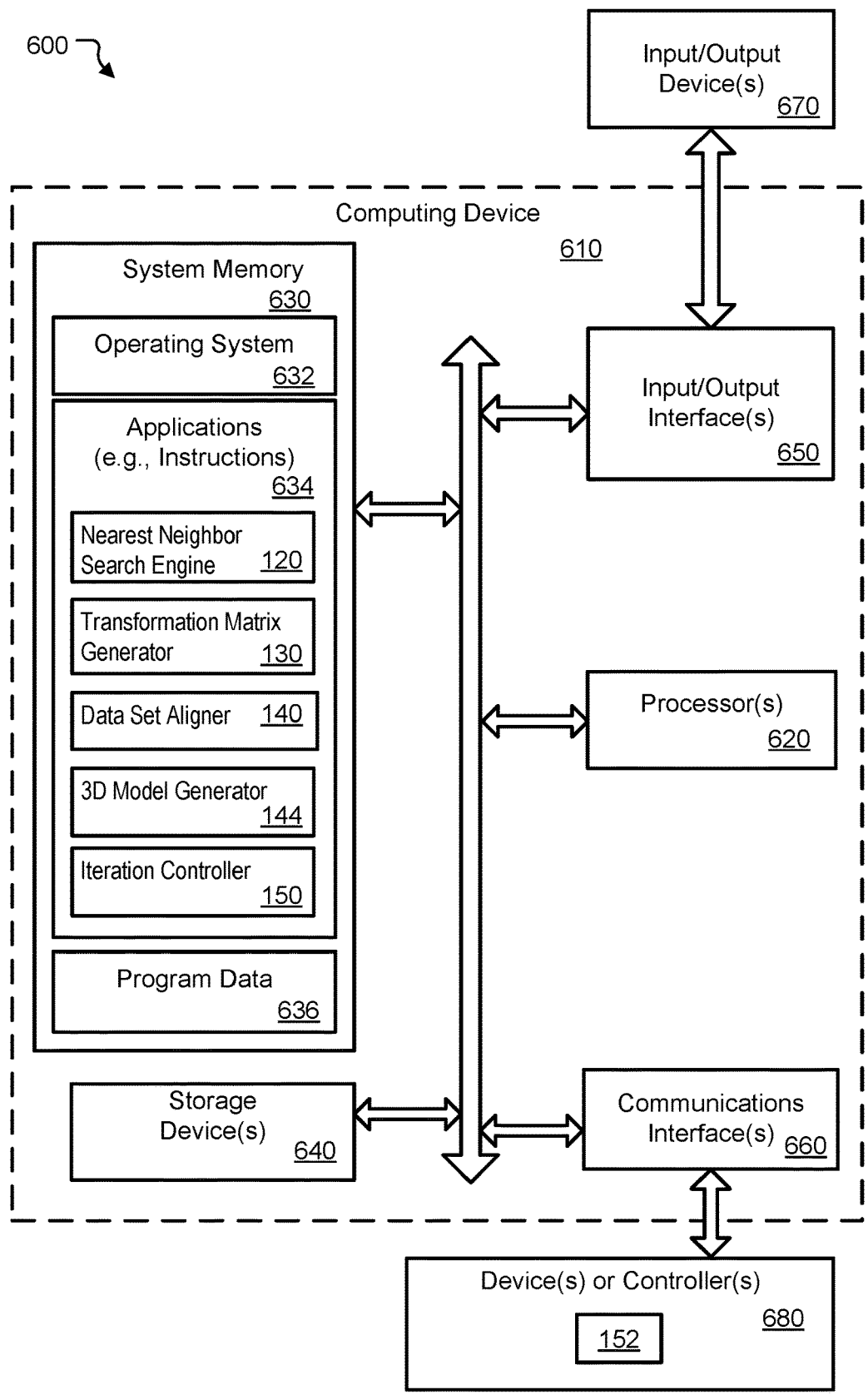
FIG. 6 is a block diagram of a computing environment including a computing device configured to support aspects of computer-implemented methods and computer-executable program instructions (or code) according to the present disclosure.

FIG. 6 is a block diagram of a computing environment 600 including a computing device 610 configured to support aspects of computer-implemented methods and computer-executable program instructions (or code) according to the present disclosure. For example, the computing device 610, or portions thereof, is configured to execute instructions to initiate, perform, or control one or more operations described with reference to FIGS. 1-5.

The computing device 610 includes one or more processors 620. The processor(s) 620 are configured to communicate with system memory 630, one or more storage devices 640, one or more input/output interfaces 650, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which may include a basic input/output system for booting the computing device 610 as well as a full operating system to enable the computing device 610 to interact with users, other programs, and other devices. The system memory 630 stores system (program) data 636, such as the first set of surface data 106, the second set of surface data 107, the third set of surface data 108, the first pairs of closest corresponding points 122, the second pairs of closest corresponding points 124, data descriptive of the rotation matrix 132, data descriptive of the translation matrix 134, the 3D model 148, other data, or a combination thereof.

The system memory 630 includes one or more applications 634 (e.g., sets of instructions) executable by the processor(s) 620. As an example, the one or more applications 634 include instructions executable by the processor(s) 620 to initiate, control, or perform one or more operations described with reference to FIGS. 1-5. To illustrate, the one or more applications 634 include instructions executable by the processor(s) 620 to initiate, control, or perform one or more operations described with reference to the nearest neighbor search engine 120, the transformation matrix generator 130, the data set aligner 140, the 3D model generator 144, the iteration controller 150, or a combination thereof.

The one or more storage devices 640 include nonvolatile storage devices, such as magnetic disks, optical disks, or flash memory devices. In a particular example, the storage devices 640 include both removable and non-removable memory devices. The storage devices 640 are configured to store an operating system, images of operating systems, applications (e.g., one or more of the applications 634), and program data (e.g., the program data 636). In a particular aspect, the system memory 630, the storage devices 640, or both, include tangible computer-readable media. In a particular aspect, one or more of the storage devices 640 are external to the computing device 610.

The one or more input/output interfaces 650 that enable the computing device 610 to communicate with one or more input/output devices 670 to facilitate user interaction. For example, the one or more input/output interfaces 650 can include a display interface, an input interface, or both. The processor(s) 620 are configured to communicate with devices or controllers 680 via the one or more communications interfaces 660. For example, the one or more communications interfaces 660 can include a network interface. The devices or controllers 680 can include, for example, the first 3D sensor 102, the second 3D sensor 103, the third 3D sensor 104, the robotic device 152, other devices, or a combination thereof.

In conjunction with the described systems and methods, an apparatus is disclosed that includes means for performing a nearest neighbor search based on adjacency data that indicates pairs of overlapping sets of multiple sets of surface data to identify, in each pair of overlapping sets, pairs of closest corresponding points that are within a threshold distance of each other, each of the multiple sets corresponding to a respective portion of a surface of an object and including three-dimensional (3D) point positions of that portion of the surface of the object. For example, the means for performing the nearest neighbor search may correspond to the nearest neighbor search engine 120.

The apparatus includes means for determining one or more transformation matrices to reduce a global distance metric that corresponds to distances between the points of each identified pair of closest corresponding points. For example, the means for determining may correspond to the transformation matrix generator 130.

The apparatus also includes means for generating updated 3D point positions by applying the one or more transformation matrices to one or more of the multiple sets. For example, the means for generating may correspond to the data set aligner 140.

In some implementations, a non-transitory, computer readable medium stores instructions that, when executed by a processor, cause the processor to initiate, perform, or control operations to perform part or all of the functionality described above. For example, the instructions may be executable to implement one or more of the methods of FIGS. 2-5. In some implementations, part or all of one or more of the methods of FIGS. 2-5 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus comprising:
a nearest neighbor search engine configured to receive multiple sets of surface data, each of the multiple sets corresponding to a respective portion of a surface of an object and including three-dimensional (3D) point positions of that portion of the surface of the object, and to perform a nearest neighbor search based on adjacency data that indicates pairs of overlapping sets of the multiple sets to identify, in each pair of overlapping sets, pairs of closest corresponding points that are within a threshold distance of each other;
a transformation matrix generator configured to determine one or more transformation matrices to reduce a global distance metric that corresponds to distances between the points of each identified pair of closest corresponding points; and
a data set aligner configured to generate updated 3D point positions by applying the one or more transformation matrices to one or more of the multiple sets.

2. The apparatus of claim 1, further comprising a 3D model generator configured to receive the multiple sets after generation of the updated 3D point positions and to combine the multiple sets to generate a 3D model of the object.

3. The apparatus of claim 1, further comprising one or more 3D sensors configured to perform a 3D scan of the object to generate the multiple sets of surface data.

4. The apparatus of claim 1, further comprising an iteration controller configured to route the updated 3D point positions to an input of the nearest neighbor search engine to initiate a next iteration of an iterative point correspondence and registration process.

5. The apparatus of claim 4, wherein the iteration controller is configured to initiate one or more additional iterations of the iterative point correspondence and registration process until at least one of:
a termination condition is satisfied; or
a threshold number of iterations have been performed.

6. The apparatus of claim 5, wherein the termination condition is satisfied in response to a transformation distance metric being less than a transformation distance threshold.

7. The apparatus of claim 1, wherein the adjacency data corresponds to a graph, wherein each node in the graph corresponds to a respective set of surface data, and wherein each edge connecting two nodes in the graph indicates that an amount of overlap between the respective sets of surface data that correspond to the two nodes is above a threshold.

8. The apparatus of claim 1, wherein the transformation matrix generator is further configured to generate a bipartite graph that includes a first set of nodes and a second set of nodes, wherein each node in the first set of nodes corresponds to a respective set of the multiple sets of surface data, wherein each node of the second set of nodes corresponds to a respective pair of points of the identified pairs of closest corresponding points, and wherein each node of the second set of nodes is connected to two nodes of the first set of nodes.

9. A method comprising:
receiving multiple sets of surface data, each of the multiple sets corresponding to a respective portion of a surface of an object and including three-dimensional (3D) point positions of that portion of the surface of the object;
performing a nearest neighbor search, based on adjacency data that indicates pairs of overlapping sets of the multiple sets, to identify, in each pair of overlapping sets, pairs of closest corresponding points that are within a threshold distance of each other;
determining one or more transformation matrices to reduce a global distance metric that corresponds to distances between the points of each identified pair of closest corresponding points; and
performing an alignment with respect to the multiple sets, wherein performing the alignment includes generating updated 3D point positions by applying the one or more transformation matrices to one or more of the multiple sets.

10. The method of claim 9, wherein the object includes a component of an aircraft.

11. The method of claim 9, further comprising, after performing the alignment with respect to the multiple sets, combining the multiple sets to generate a 3D model of the object.

12. The method of claim 11, further comprising controlling a robotic device to interact with the object based on the 3D model.

13. The method of claim 9, further comprising performing a 3D scan of the object to generate the multiple sets of surface data.

14. The method of claim 9, wherein the nearest neighbor search, determining the one or more transformation matrices, and generating the updated 3D point positions are performed during a first iteration of an iterative point correspondence and registration process, the method further comprising:
performing one or more additional iterations of the iterative point correspondence and registration process until at least one of a termination condition is satisfied or a threshold number of iterations have been performed, wherein the termination condition is satisfied in response to a transformation distance metric being less than a transformation distance threshold.

15. The method of claim 9, wherein the adjacency data corresponds to a graph, wherein each node in the graph corresponds to a respective set of surface data, wherein each edge connecting two nodes in the graph indicates that an amount of overlap between the respective sets of surface data that correspond to the two nodes is above a threshold, and wherein the nearest neighbor search is selectively performed on pairs of nodes based on the edges.

16. The method of claim 15, wherein the nearest neighbor search includes:
locating a first node in the graph;
locating a second node connected to the first node via an edge in the graph;
generating a k-dimensional (k-d) tree structure for the 3D point positions of the set of surface data corresponding to the second node; and
locating, for each point in a set of the multiple sets of surface data corresponding to the first node, the closest point that is within the threshold distance in a set of the multiple sets of surface data corresponding to the second node based on traversing the k-d tree structure.

17. The method of claim 9, further comprising:
generating a bipartite graph that includes a first set of nodes and a second set of nodes, wherein each node in the first set of nodes corresponds to a respective set of the multiple sets of surface data, wherein each node of the second set of nodes corresponds to a respective pair of points of the identified pairs of closest corresponding points, and wherein each node of the second set of nodes is connected to two nodes of the first set of nodes; and
processing the bipartite graph to determine the one or more transformation matrices.

18. A non-transitory, computer readable medium storing instructions that, when executed by a processor, cause the processor to initiate, perform, or control operations comprising:
receiving multiple sets of surface data, each of the multiple sets corresponding to a respective portion of a surface of an object and including three-dimensional (3D) point positions of that portion of the surface of the object;
performing a nearest neighbor search, based on adjacency data that indicates pairs of overlapping sets of the multiple sets, to identify, in each pair of overlapping sets, pairs of closest corresponding points that are within a threshold distance of each other;
determining one or more transformation matrices to reduce a global distance metric that corresponds to distances between the points of each identified pair of closest corresponding points; and
performing an alignment with respect to the multiple sets, wherein performing the alignment includes generating updated 3D point positions by applying the one or more transformation matrices to one or more of the multiple sets.

19. The non-transitory, computer readable medium of claim 18, wherein the nearest neighbor search, determining the one or more transformation matrices, and generating the updated 3D point positions are performed during a first iteration of an iterative point correspondence and registration process, the operations further comprising:
performing a second iteration of the iterative point correspondence and registration process using the updated 3D point positions to generate next updated 3D point positions.

20. The non-transitory, computer readable medium of claim 18, wherein the adjacency data corresponds to a graph, wherein each node in the graph corresponds to a respective set of surface data, and wherein each edge connecting two nodes in the graph indicates that an amount of overlap between the respective sets of surface data that correspond to the two nodes is above a threshold.

* * * * *